(12) United States Patent
Fontaine et al.

(10) Patent No.: US 8,393,497 B2
(45) Date of Patent: Mar. 12, 2013

(54) POWDER-METERING APPARATUS WITH AN IMPACT DEVICE

(75) Inventors: Ivan-William Fontaine, Neuilly-sur-Marne (FR); Didier Plier, Hautefeuille (FR)

(73) Assignee: Mettler-Toledo AG, Greifensee (CH)

(*) Notice: Subject to any disclaimer, the term of this patent is extended or adjusted under 35 U.S.C. 154(b) by 761 days.

(21) Appl. No.: 12/366,407

(22) Filed: Feb. 5, 2009

(65) Prior Publication Data

US 2009/0140003 A1   Jun. 4, 2009

Related U.S. Application Data

(63) Continuation of application No. PCT/EP2008/000807, filed on Feb. 1, 2008.

(30) Foreign Application Priority Data

Feb. 2, 2007 (EP) .................................... 07290138
Feb. 2, 2007 (EP) .................................... 07290139

(51) Int. Cl.
*B65D 83/00* (2006.01)

(52) U.S. Cl. ........... 222/1; 222/161; 222/199; 222/226; 222/325; 222/333; 141/83; 366/279

(58) Field of Classification Search ............... 366/53, 366/219, 279; 700/216, 231, 233, 235, 305; 137/581; 141/72, 83; 222/160–161, 196, 222/226, 239–241, 325, 333, 412, 544, 548, 222/199, 1; 221/7, 10, 17, 107; 177/1, 10, 177/25.19, 60; 239/659; 118/612

See application file for complete search history.

(56) References Cited

U.S. PATENT DOCUMENTS

| | | | | |
|---|---|---|---|---|
| 1,520,669 | A * | 12/1924 | Ziegner | 222/311 |
| 3,838,716 | A | 10/1974 | Ripple et al. | |
| 4,703,874 | A * | 11/1987 | Tapperman et al. | 222/198 |
| 4,843,579 | A * | 6/1989 | Andrews et al. | 700/305 |
| 5,038,839 | A * | 8/1991 | Morimoto et al. | 141/83 |
| 5,492,023 | A * | 2/1996 | Kitamura et al. | 73/866 |
| 5,544,683 | A * | 8/1996 | Guhl | 141/65 |
| 5,785,761 | A * | 7/1998 | Suzuki et al. | 118/612 |
| 6,006,946 | A * | 12/1999 | Williams et al. | 221/9 |
| 6,340,036 | B1 | 1/2002 | Toyoizumi et al. | |
| 6,382,470 | B1 * | 5/2002 | Hu et al. | 222/203 |
| 6,674,022 | B2 * | 1/2004 | Fermier et al. | 177/60 |
| 6,701,977 | B2 * | 3/2004 | Taylor et al. | 141/83 |
| 6,987,228 | B1 * | 1/2006 | MacMichael et al. | 177/116 |
| 7,284,574 | B2 * | 10/2007 | Fontaine et al. | 141/72 |
| 7,461,650 | B1 * | 12/2008 | Rand | 128/200.23 |
| DE | 19841478 | | 3/1999 | |

(Continued)

FOREIGN PATENT DOCUMENTS

| CH | 0361381 A1 * | 4/1962 |
|---|---|---|
| DE | 4036247 A1 | 5/1992 |

(Continued)

*Primary Examiner* — Kevin P Shaver
*Assistant Examiner* — Andrew P Bainbridge
(74) *Attorney, Agent, or Firm* — Standley Law Group LLP

(57) ABSTRACT

A powder-metering apparatus (1) for dispensing measured doses of a powder into a receiving container has a handling and positioning device (2) with a handling arm (3) designed to handle a metering device (4, 4a, 4b, 4c). The metering device has a reservoir container (31, 31a, 31b, 31c) with a metering head (32, 32a, 32b, 32c) which has a discharge orifice (5, 6) and a flow-control element (34, 35, 36). The flow-control element controls the rate at which powder leaves the discharge orifice. The powder-metering apparatus is equipped with an impact device (11, 111) adapted to shock the metering device with upward-directed force pulses of high intensity and short duration.

22 Claims, 4 Drawing Sheets

U.S. PATENT DOCUMENTS

| | | | |
|---|---|---|---|
| 2004/0155069 A1* | 8/2004 | Fontaine et al. | 222/412 |
| 2005/0072488 A1* | 4/2005 | Rouanet et al. | 141/12 |
| 2006/0137760 A1* | 6/2006 | Dubois et al. | 141/1 |

FOREIGN PATENT DOCUMENTS

| | | |
|---|---|---|
| DE | 10245341 A1 | 4/2004 |
| EP | 0282958 A1 | 9/1988 |
| FR | 2607794 A1 | 6/1988 |
| GB | 701572 A | 12/1953 |
| GB | 979841 A | 1/1965 |
| JP | 2000202269 A | 7/2000 |
| JP | 200219729 A | 1/2002 |
| JP | 2003146310 A | 5/2003 |
| JP | 2003285329 A | 10/2003 |

* cited by examiner

POWDER-METERING APPARATUS WITH AN IMPACT DEVICE

CROSS-REFERENCE TO RELATED APPLICATIONS

This application is a continuation under 35 USC §120 of PCT/EP2008/000807, filed 1 Feb. 2008, which is in turn entitled to benefit of a right of priority under 35 USC §119 from European patent applications 07 29 0138.2 and 07 29 0139.0, both filed on 2 Feb. 2007, the contents of each of which is incorporated by reference as if fully recited herein.

TECHNICAL FIELD

The present invention relates to an apparatus for accurately dispensing small doses of substances of a powdery consistency.

BACKGROUND OF THE ART

In chemical and pharmaceutical laboratories, it is often necessary to dispense reagents or products in powder form, in particular to prepare samples of powder combinations for serial tests. With a large number of powdered products to be tested, the successive dispensing and weighing of powder doses represents a painstaking task which requires a considerable amount of time and attention from the staff involved.

In addition to laboratory applications, there are industrial production processes where the same fill quantity of a powdery substance has to be dispensed thousands of times into identical containers.

Thus, there is a strong need for apparatus through which the dispensing of measured doses of powder can be reliably and efficiently automated in laboratories as well as production facilities.

The central element of a metering apparatus of the kind that this invention relates to is a metering device with a holding container for the powder to be dispensed and, attached to the holding container, a metering head with a discharge orifice. When the metering device is in its working position in the metering apparatus, the holding container is on top and the metering head at the bottom, so that the powder runs in a controlled stream from the discharge orifice into a receiving container. The receiving container may be positioned on a weighing device which is part of the metering apparatus and which sends a feedback signal to a shutter device that controls the aperture of the discharge orifice, so as to gradually reduce and shut off the discharge orifice when the powder dispensed into the receiving container reaches its target weight.

Alternatively, instead of setting the receiving container on a weighing device, the state of the art offers other suitable means for sensing the fill level of the receiving container, for example an optical sensor that sends a feedback signal to the powder-metering device when the fill level in the receiving container reaches a target level. In the kind of metering device that is envisaged by the present invention, the size of the powder samples being metered out is typically in the range from 0.5 milligrams to 5 grams. Especially for small samples, the precision required is ±0.1 mg or even less.

Some powders will run easily in an even stream out of a small orifice, comparable to the sand in an hourglass. In this case, the powder flow can indeed be controlled simply by varying the cross section of the orifice with an appropriate shutter device. However, in many powdery materials the particles have a tendency to stick together which is known as cohesion, and the powder may also have a degree of volume compressibility, so that the material can become compacted and, as a result, clog up the discharge orifice or leave the orifice in lumps rather than in an easy-flowing fine stream. As a typical example, corn starch exhibits cohesion as well as compactibility to a very high degree and is therefore often used as a test material to evaluate the capabilities of powder-metering apparatus.

The problems that the cohesion and compactibility—often simply referred to as "stickiness"—of powders causes in powder-metering devices has long been known and numerous solutions have been proposed, including for example: Archimedean feed screws to move the powder material to and expel it from the discharge orifice; stirring and scraping devices to loosen the powder, to scrape it off the walls of the container and metering head and off the feed screw and to collapse bridges and cavities that can form in the powder inside the holding container and metering head; tapping and vibrating devices serving likewise to loosen the powder as well as keep it from adhering to the walls of the container and metering head.

To evaluate and compare the capabilities of state-of-the-art powder-metering devices as well as of the device of the present invention, the applicant has developed a rating scale for the stickiness of powders, wherein a free-flowing powder (as the aforementioned sand in an hourglass) is assigned a numerical grade of 1 and cornstarch is assigned a grade between 7 and 8. When the same cornstarch was used over and over again in the tests conducted by the applicant, the stickiness increased gradually from 7 to 8 as the material absorbed humidity from the air and/or when the powder grains were crushed by the feeding, stirring and scraping elements in the metering devices.

A powder-dispensing device disclosed in Great Britain Pat. B 701,572 has a cylindrical hopper with a conical, funnel-shaped bottom portion. A vertically oriented Archimedean feed screw extends downward through the discharge passage of the funnel. A stirrer/scraper arm moves concentrically, but with the opposite sense of rotation, about the feed screw shaft, thereby stirring the powder in the holding container as well as scraping powder off the feed screw and the funnel wall.

Another powder-dispensing device, which is disclosed in French Pat. 2 607 794, has a funnel-shaped hopper. The discharge orifice at the bottom of the hopper has a plunger valve with a plunger shaft descending vertically from an actuating mechanism above the hopper. A helix-shaped feeder snake is arranged to rotate concentrically about the plunger shaft with a slight clearance from the latter.

In the two foregoing examples and also in general, the use of Archimedean screws for cohesive and compactable powders can be problematic in that the helicoidal grooves of the screw can become firmly clogged with powder so that the Archimedean screw and the powder in its grooves rotate together as a solid cylinder and, as a result, no powder comes out of the discharge orifice.

As a further example of the prior art, a dosage-dispensing device which is disclosed in German laid-open application 198 41 478 A1 has a cylindrical hopper with a funnel-shaped bottom. The discharge orifice has a shutter in the form of a plunger valve with a plunger shaft descending vertically from an actuating mechanism above the hopper. A stirrer/scraper device with three arms moves concentrically about the plunger shaft, thereby stirring the powder in the holding container as well as scraping powder off the plunger and the funnel wall. Analogous to the foregoing examples, there is again the possible problem that the powder in the hopper, particularly in the funnel-shaped bottom part, may become compacted into a cohesive mass that simply rotates inside the hopper together with the stirrer/scraper device.

A solution to the aforementioned problems has previously been proposed in commonly-owned U.S. Pat. No. 7,284,574, which issued on 23 Oct. 2007. A device for metering powder quantities in the range from milligrams to a few grams with an accuracy of the order of one-tenth of a milligram has a holding container with a conically narrowing bottom portion and a discharge orifice with a shutter valve to regulate the powder flow. The device includes means for vibrating and/or tapping the container, and may further include a rotary stirring device which may in addition move back and forth in the direction of its axis. As a result, the powder will drop through the orifice under its own gravity without the use of an Archimedean feed screw.

Similar to the last-mentioned solution, a device proposed in commonly-owned and currently pending US published application 2004/0155069, has a cylindrical holding container with a cap containing an Archimedean feed screw oriented at a right angle to the cylinder axis of the container. When the metering device is in its working position in an automated powder-dispensing system, the holding container is on top and the cap with the feed screw at the bottom. Powder from the holding container enters the horizontal feed screw tunnel through an opening from above and is pushed along the tunnel to a discharge opening from where the powder drops into a receiving container. The flow rate of the powder discharged from the orifice is in this case controlled by varying the speed of the horizontal feed screw.

For powders that are not too cohesive and compactable, the last-mentioned powder-metering device with at least one of the means for vibrating, tapping, rotary stirring, and up/down motion of the stirrer shows the desired capability for metering powder quantities in the milligram-to-gram range with an accuracy of the order of one-tenth of a milligram or less. However, its performance still fell short in tests with corn starch which, as mentioned above, is often used as a test material to evaluate powder-metering devices for their capability to handle very compactable and cohesive powders.

In evaluating the state of the art of powder-metering devices, the applicant found that different designs are used for powders with different flow properties and/or for different dosage quantities and/or for different precision requirements. This leads to the further conclusion that there is an unmet need for a design concept where the same metering device has the ability to dispense any powder from free-flowing sand to a sticky and clogging material such as cornstarch, i.e. from grade 1 to grade 8 on the aforementioned rating scale for the stickiness of powders, in dosage quantities from under a milligram to 5 grams and over, and with a precision better than one-tenth of a milligram.

It is therefore the object of the present invention to provide a further improved powder-metering apparatus that is capable of dispensing measured doses of powder in the range from about 0.5 milligrams to 5 grams with an accuracy of the order of one-tenth of a milligram or less for powders that cover the full range from free-flowing (comparable to hourglass sand) to highly cohesive and clogging (for example cornstarch).

SUMMARY

According to the invention, the foregoing objective is met by a powder-metering apparatus which includes a handling mechanism designed to handle a metering device, wherein the latter consists of a powder container with a metering head which has a discharge orifice and a flow-regulating device to control the rate at which powder leaves the discharge orifice.

In particular, the powder-metering apparatus according to the invention is equipped with an impact device designed to impart upward-directed shocks to the metering device, i.e. force pulses of high intensity and short duration which are directed upwards.

In addition, it was found advantageous if the metering device is constrained or guided in the powder-metering apparatus with a degree of vertical mobility of a few millimeters. Thus, if the metering device is initially in a rest position, an upward-directed force pulse will cause an abrupt upward acceleration and movement of the metering device which, in turn generates a downward-directed inertial force in the powder, which propels the powder in the metering head to move downward in relation to the metering device and to pass through the orifice. Of course, the same effect of a downward-directed inertial force which urges the powder towards the orifice could also be achieved with an abrupt deceleration where the metering device is initially moving downward and is abruptly stopped. It was found that such vertical shocks, applied continuously at a rate from about 1 to 20 cycles per second with a controlled intensity of the impact and a movement amplitude of as much as 5 mm are highly effective in promoting a free flow of powder from the orifice of the metering device.

In preferred embodiments of the invention, the impact device is a mechanical hammer device with an impact mass in the shape of a rod or cylinder which rams against the bottom of the metering device. The ramming end of the rod is rounded so that the impact is concentrated in a point.

In a typical embodiment of the invention the mechanical hammer device can be driven by an appropriate pneumatic or electromagnetic actuating mechanism so that it moves back and forth in the direction of its longitudinal axis which should ideally coincide with or preferably not deviate by more than 45° from the vertical direction, as the amount of vertical momentum mv (mass times velocity) that the hammer imparts to the metering device decreases with the cosine of the angle by which the impact direction of the hammer deviates from the vertical. Thus, instead of or in addition to controlling the intensity of the impact by way of the pneumatic or electromagnetic actuating mechanism, one could also vary the vertical component of the impact momentum by changing the angle of the impact direction relative to the vertical.

The impact of the hammer device causes an upward-directed shock acceleration of the metering device, so that the latter will be jolted to move upwards by as much as a few millimeters and then be returned to its original position by its own weight and/or by the position-restoring force of a pre-tensioned spring.

As an alternative to the hammer device, the impact device can comprise a means to propel the metering device in a downward direction against a stationary mechanical stop element. The collision with the stop element causes an abrupt deceleration of the metering device and causes a downward-directed inertial force in the powder which pushes the latter to move downward in relation to the metering device and to pass through the discharge orifice.

Regardless of the manner in which the impacts on the metering device are generated, it was found advantageous if the frequency as well as the amplitude (i.e., the strength or intensity) of the impacts or force pulses can be regulated depending on the flow properties of the powder and the desired rate of delivery. For example, the pulse frequency can be as high as 20 impacts per second and slow down to zero as the filling process approaches the targeted fill quantity.

It has proven advantageous to arrange a spring element in the metering apparatus which exerts a vertically directed spring force on the metering device which pushes the metering device back to its rest position after it has been displaced by an impact.

It is further advantageous to include a vibration- and/or shock-damping device in the metering apparatus. This can be useful to prevent resonance vibrations when the impact frequency reaches a resonance frequency of the metering apparatus, and it can also serve to slow down and stop the further movement of the metering device after the initial shock acceleration has ceased.

The powder-metering apparatus can be designed, in principle, to use a metering device that includes any of the known state-of-the-art elements, such as for example an Archimedean feed screw to move the powder material to and expel it from the discharge orifice; stirring and scraping devices to loosen the powder, to scrape it off the walls of the container and metering head and off the feed screw and to collapse bridges and cavities that can form in the powder inside the holding container and metering head.

Typically, the flow-regulating device which controls the powder flow through the orifice of the metering device is a shutter element that allows a controlled variation of the aperture of the discharge orifice. The shutter element can be a substantially cylindrical shutter valve element which is rotatably seated in a horizontal bore in the bottom part of the metering head and cooperates with the discharge orifice so as to form an aperture passage of variable size.

As an alternative possibility, the flow-regulating device can be an Archimedean feed screw that moves powder through a horizontal tunnel from the bottom of the powder container to the discharge orifice. The discharge rate out of the orifice is controlled by varying the speed of the feed screw.

In a typical embodiment, the inventive powder-metering apparatus with an impact device holds a powder-metering device in its working position above a receiving container which may be resting on a weighing device. The impact device, which can be configured for example as a mechanical hammer device as described above, is arranged so that its impact ram is directed vertically or at an acute angle to the vertical against the substantially horizontal bottom surface of the metering device. An electronic controller manages the powder delivery based on feedback signals from the weighing device by controlling the flow-regulating device at the orifice of the metering device, the speed of rotation of a stirrer, scraper and/or feeder device, and by regulating the frequency and intensity of the strikes of the hammer device.

Alternatively, instead of a weighing device, the powder-metering apparatus according to the invention could employ any other suitable means for sensing the fill level of the receiving container, for example an optical sensor that sends feedback signals to the electronic controller device, so that the latter can respond for example by reducing and finally closing the aperture of the orifice of the metering device and by decreasing the frequency and/or intensity of the strikes of the hammer device as the fill level in the receiving container approaches a target level.

BRIEF DESCRIPTION OF THE DRAWINGS

Preferred embodiments of the invention are hereinafter described in further detail with references to the attached drawings, wherein identical parts are identified with identical reference numbers and wherein.

DETAILED DESCRIPTION OF THE DRAWINGS

Figure 1:
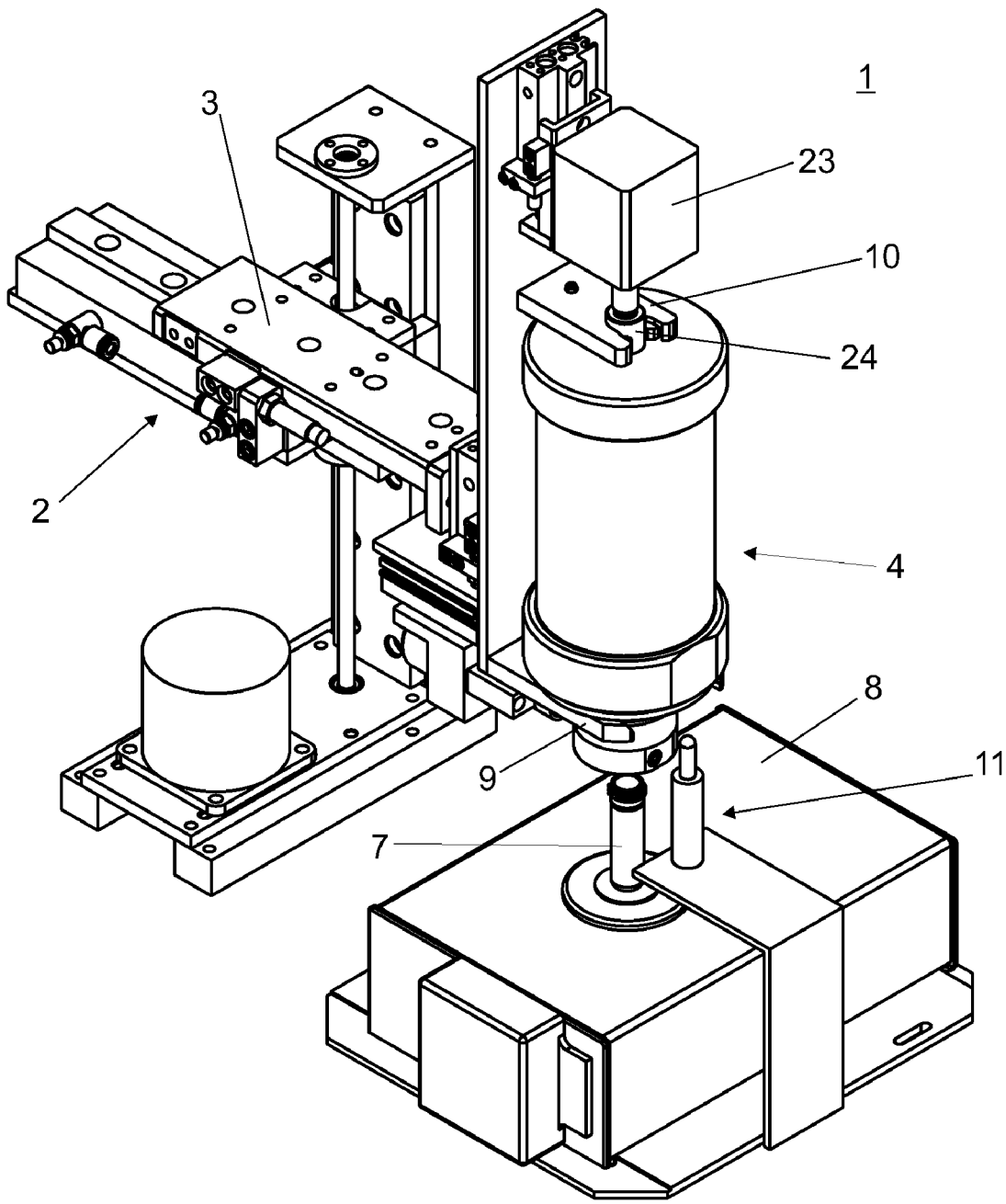
FIG. 1 is a perspective view of an embodiment of a powder-metering apparatus.
Figure 2:
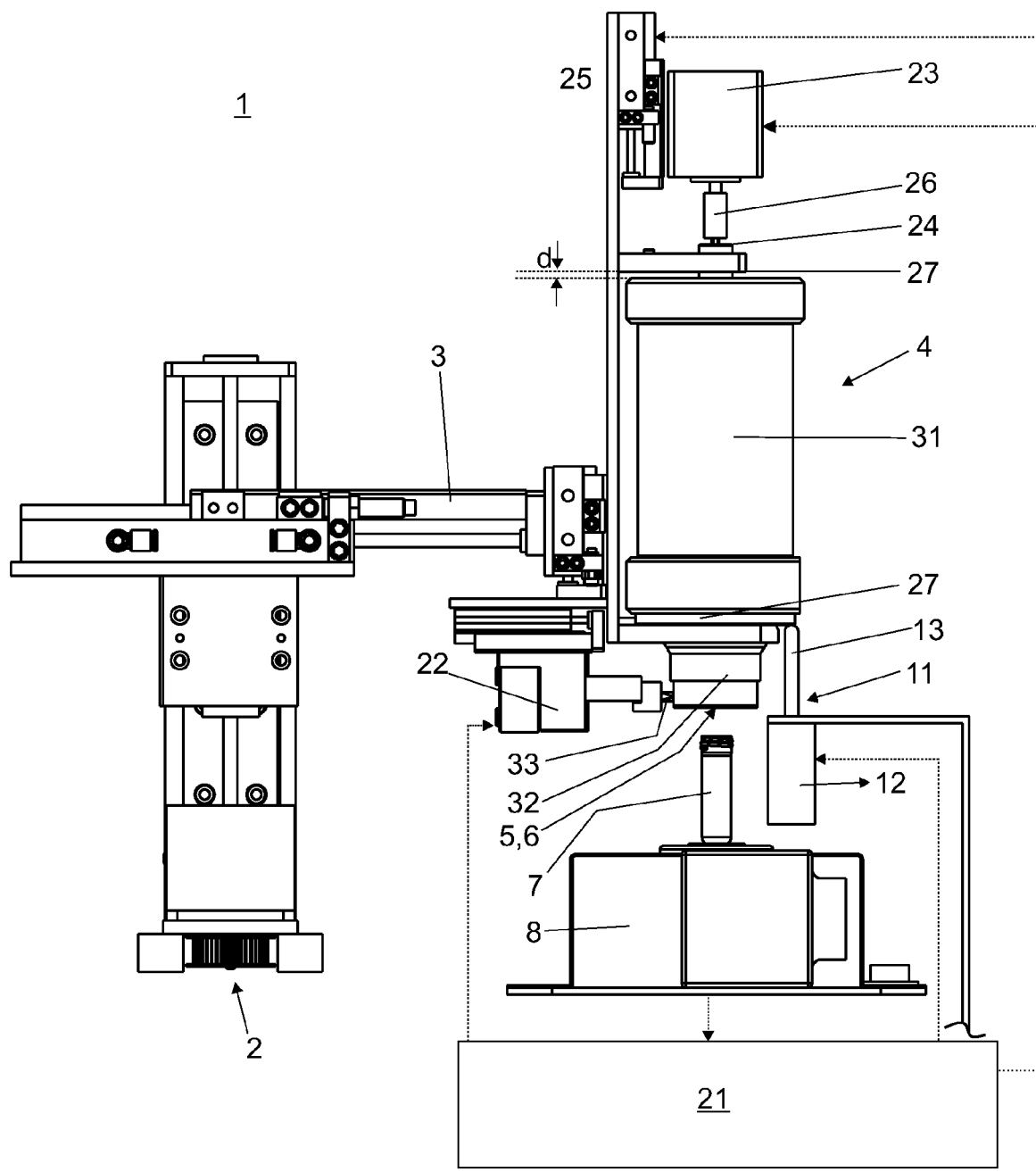
FIG. 2 is a side elevation view of the FIG. 1 apparatus.

A powder-metering apparatus 1 according to the invention is shown in perspective in FIG. 1 and in a view from the side in FIG. 2. Identical elements shown in different drawing figures have the same reference elements.

The powder-metering apparatus 1 has a handling and positioning device 2 with a handling arm 3 which holds a metering device 4 so that its discharge orifice (reference symbol 5 in FIG. 4a or reference symbol 6 in FIGS. 4b and 4c) is positioned above a receiving container 7 which rests on a weighing device 8.

The metering device 4 is held in place on the handling arm 3 between a bottom bracket 9 and a top bracket 10 with a vertical play d allowing a vertical movement of the metering device 4 by a few millimeters. An impact device 11 with a pneumatic or electromagnetic impact actuator 12 and impact ram 13 is arranged so that the impact ram 13 strikes upward against the bottom of the metering device 4.

Each hammer strike of the impact ram 13 causes an upward-directed shock acceleration of the metering device 4 with an upward movement which is limited by the vertical play d. The upward acceleration of the metering device 4, in turn, causes a downward-directed inertial force in the powder inside the metering device which pushes the powder to move downward in relation to the metering device and to pass through the discharge orifice. The metering device 4 returns to its rest position on the bottom bracket 9 either under its own gravity alone or with the assistance of a downward-directed spring force.

Figure 3:
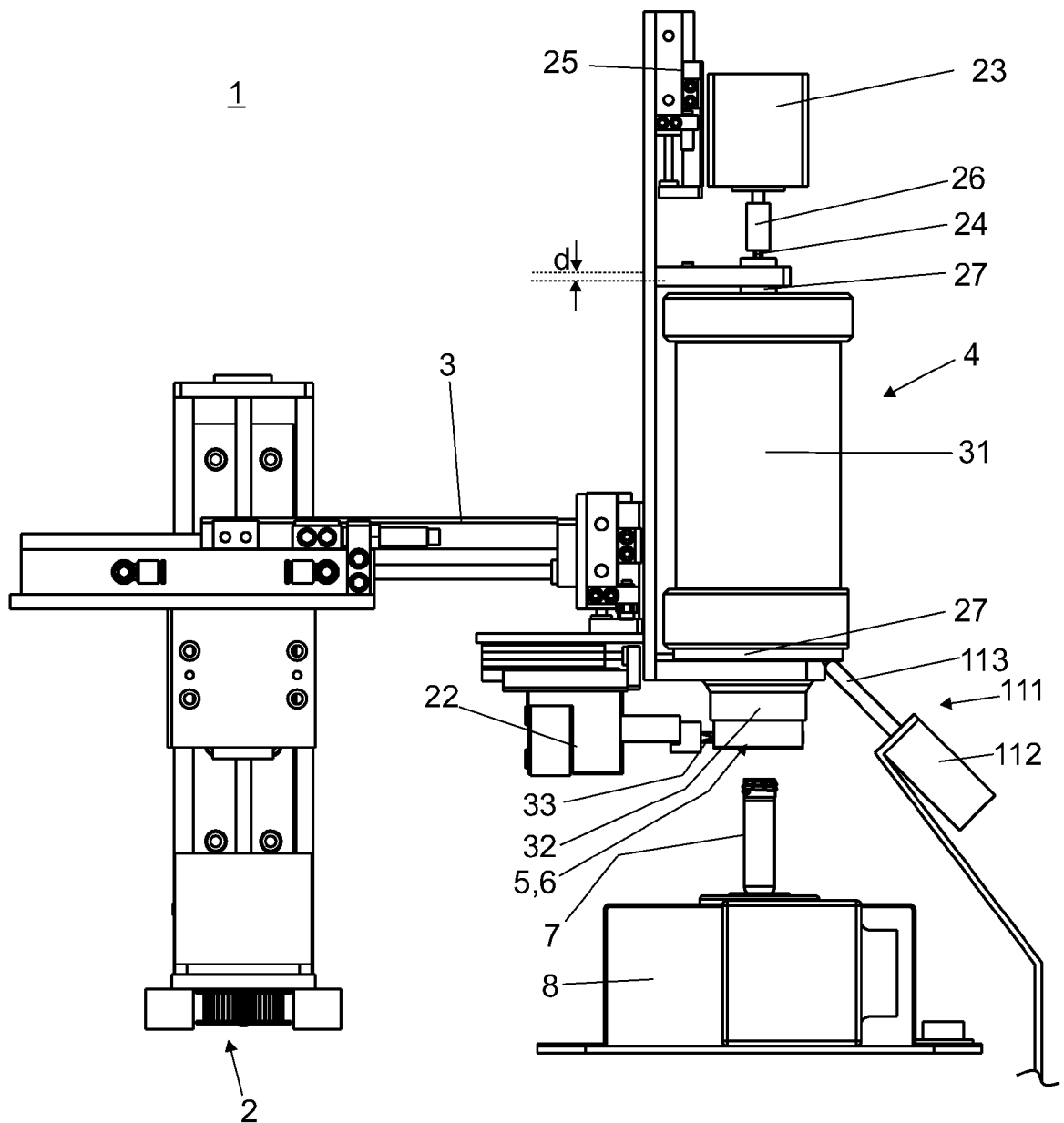
FIG. 3 is a side elevation view of the FIG. 1 apparatus, depicting an alternative embodiment of the impact device.

FIG. 3 represents the FIG. 1 apparatus in a plan view from the side, wherein the embodiment of the impact device 111 distinguishes from the impact device 11 of FIG. 1 and FIG. 2. The longitudinal axis of the impact ram 113 of the impact device 111 is oriented at an angle that deviates by less than 45° from the vertical direction. In a specific embodiment the impact device comprises a means of changing said deviation from the vertical in order to change the vertical component of the angular momentum imparted to the metering device 4 by the impact ram 113.

Figures 4A, 4B, 4C:
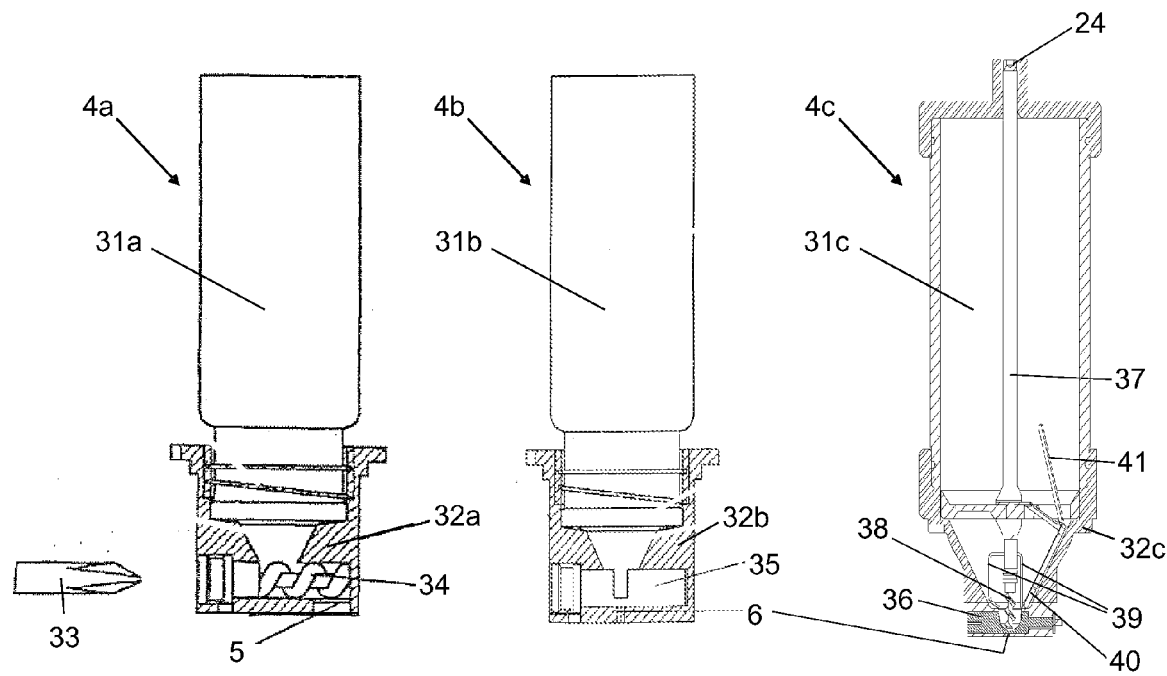
FIGS. 4a, 4b and 4c are side sectional views of alternate embodiments of metering devices of the type used in metering apparatus.

FIGS. 4a to 4c illustrate typical metering devices 4a, 4b, 4c, respectively, that can be used in the powder-metering apparatus 1 of the present invention. The main parts of the metering device 4a, 4b, 4c are a reservoir container 31a, 31b, 31c shaped like a cylindrical bottle, and a metering head 32a, 32b, 32c which also serves as a screw-on bottle cap for the reservoir container. When the metering device 4a, 4b, 4c is in its working position in the powder-metering apparatus 1, the reservoir container 31a, 31b, 31c is on top and the metering head 32a, 32b, 32c is at the bottom with the orifice opening 5, 6 positioned vertically above the receiving container 7 (as previously explained in the context of FIGS. 1 and 2).

A coupling device 33, shaped in this example like a Phillips screwdriver bit, engages a powder flow control element in the metering head 32a, 32b, 32c. In the example of FIG. 4a, the powder flow control element is a horizontal feed screw 34 which moves powder horizontally from a funnel shaped passage in the metering head 32a to the laterally offset discharge orifice 5. In FIGS. 4b and 4c, the powder flow control element is a cylindrical shutter valve element 35, 36 which is rotatably seated in a horizontal bore in the bottom part of the metering head 32b, 32c and cooperates with the discharge orifice 6 so as to form an aperture passage of variable size.

The metering device 4c in FIG. 4c has a rotary vertical shaft 37 with one or more powder-flow-promoting elements such as for example a vertical feed screw 38, a stirrer device 39 preventing powder from clogging up the feed screw, a scraper element 40 to scrape powder off the inside wall of the metering head 32c, and a powder-loosening element 41 to prevent the formation of bridges and cavities in the powder in the reservoir container 31c.

Figure 5:
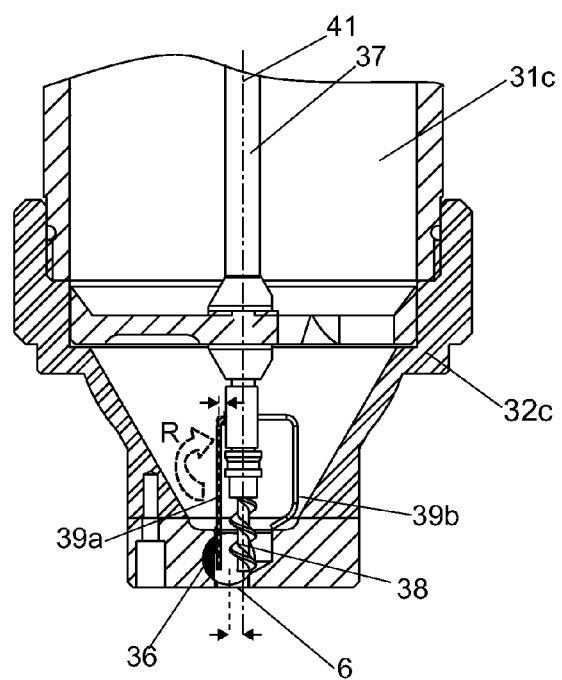
FIG. 5 is an enlarged side sectional detail view of the FIG. 4c metering device, rotated about 90° along the central longitudinal axis.

As is shown in FIG. 5, the stirrer device 39 comprises a first stirrer element 39a and a second stirrer element 39b that can rotate about the central longitudinal axis 42 of the metering device. Specifically the movement of the first stirrer element 39a introduces a flow pattern in the powder in the metering head 32c so that powder which is not expelled by the vertical feed screw 38 through the discharge orifice 6 is directed radially outward and upward from the discharge orifice 6 on a circulatory path R that returns the same powder for a new approach to the vertical feed screw 38. The first stirrer element 39a is configured as a thin rod which extends parallel to the longitudinal axis 42 at a narrow distance, preferably between 0.5 to 2 mm, essentially along the entire length of the vertical feed screw 38. The first stirrer element 39a rotates about the central longitudinal axis 42, so that in its rotation about the central longitudinal axis 42, the first stirrer element 39a sweeps a cylindrical space surrounding the vertical feed screw 38.

As shown in FIG. 2, a powder-metering apparatus 1 according to the invention includes an electronic controller 21 with signal connections to the operating elements of the apparatus. In the example of FIG. 2, the weighing device 8 sends a continuously updated weighing signal to the electronic controller 21. Based on the weighing signal, the controller 21 controls the actuator 22 which by way of the coupling device 33 drives the powder flow control element 34, 35, 36 (see FIGS. 4a to 4c). The electronic controller 21 further controls the impact device 11 by regulating the frequency and intensity of the hammer strikes of the impact ram 13 against the bottom of the powder-metering device 4. If the powder-metering device 4 is equipped with rotary feeder-, stirrer- and/or scraper devices on a vertical shaft 37 (as in FIG. 4c), the electronic controller also controls the motor 23 that drives the vertical shaft 37 through a releasable coupling 24.

As an alternative to the impact device 11 with the impact ram 13, the powder-metering apparatus 1 can be equipped with a means for propelling the metering device 4 in a downward direction against a stationary mechanical stop element. The collision with the stop element causes an abrupt deceleration of the metering device and causes a downward-directed inertial force in the powder which pushes the latter to move downward in relation to the metering device and to pass through the discharge orifice. In the powder-metering apparatus 1 of FIGS. 1 and 2, the latter concept can be realized for example in the following way: Instead of resting on the bottom bracket 9, the metering device 4 is spring-biased against the top bracket 10, so that there is a vertical play of a few millimeters between the bottom bracket 9 and the bottom of the metering device 4. The linear actuator 25 (which otherwise serves to hold the motor 23 in position) is used to push the metering device 4 downward into collision with the bottom bracket 9. As explained previously, the impact causes the powder inside the metering device to be propelled downward in relation to the metering device and to pass through the discharge orifice (5, 6).

To prevent resonance vibrations when the impact frequency reaches a resonance frequency of the metering apparatus 1, and also to slow down and stop the further movement of the metering 4 device after the initial shock acceleration has ceased, the apparatus 1 can include one or more state-of-the art damping features such as for example a piston-type shock absorber 26 integrated in the coupling 24 and/or shock-absorbing pads 27 of soft rubber on the brackets 9, 10.

Even though the invention has been described through the presentation of specific embodiments, those skilled in the pertinent art will recognize numerous possibilities for variations and alternative embodiments, for example by combining and/or exchanging features of individual embodiments either with each other or with further features that belong to the known state of the art. To name only one example, the impact element which is illustrated as a ramming device with a linear-motion actuator could also be configured like a hammer that swings against the metering device in a swivel motion. Accordingly, it will be understood that such variations and alternative embodiments are considered as being included in the present invention and that the scope of the invention is limited only by the attached patent claims and their equivalents.

What is claimed is:

1. An apparatus for dispensing measured doses of a powder into a receiving container, the apparatus comprising:
   a metering device comprising:
      a reservoir container;
      a metering head on the reservoir container, the metering head having a discharge orifice and a flow control element for controlling the rate at which the powder leaves the discharge orifice;
   a handling and positioning device with a handling arm adapted to handle the metering device;
   a bottom bracket and a top bracket, each bracket located external to the metering device, the brackets co-acting to constrain a vertical play of the metering device in the apparatus, the metering device being guided to perform linear vertical movements within the range of vertical play; and
   an impact device operable to strike the metering device with upwardly-directed force pulses of high intensity and short duration.

2. The apparatus of claim 1, wherein:
   the impact device generates upwardly-directed force pulses of such high intensity that each pulse creates an abrupt upward acceleration and upward movement of the metering device to generate a downwardly-directed inertial force in the powder inside the metering device, propelling the powder to move downward in relation to the metering device and to pass through the discharge orifice.

3. The apparatus of claim 1, further comprising:
   a means for abruptly stopping a downward movement of the metering device, arranged on the impact device,
   wherein an upwardly-directed force pulse in the form of a collision force is generated by abruptly stopping the downward movement, causing an abrupt deceleration and downwardly-directed inertial force in the powder inside the metering device, propelling the powder to move downward in relation to the metering device and to pass through the discharge orifice.

4. The apparatus of claim 2, wherein:
the impact device generates the upwardly-directed force-pulses continuously at a rate ranging from about 1 to about 20 cycles per second with a controlled intensity of the impact and a movement amplitude of as large as 5 mm.

5. The apparatus of claim 1, wherein:
the impact device comprises a mechanical hammer device with an impact ram in the shape of a rod or cylinder, positioned to strike the bottom of the metering device.

6. The apparatus of claim 5, further comprising:
a rounded end on a ramming end of the impact ram, to concentrate the impact force.

7. The apparatus of claim 5, further comprising:
a pneumatic or electromagnetic impact actuator that drives the impact ram to perform a reciprocating linear movement in the direction of a longitudinal axis of the impact ram.

8. The apparatus of claim 5, wherein:
a bottom of the metering device is substantially horizontal at the point of impact; and
the longitudinal axis of the impact ram is oriented substantially in the vertical direction.

9. The apparatus of claim 5, wherein:
a bottom of the metering device is substantially horizontal at the point of impact; and
the longitudinal axis of the impact ram deviates from the vertical direction by less than 45°.

10. The apparatus of claim 9, further comprising:
a means of changing the deviation from the vertical of the impact ram, to change the vertical component of the angular momentum imparted to the metering device by the impact ram.

11. The apparatus of claim 1, further comprising:
means for lifting the metering device off the bottom bracket and for propelling the metering device into a collision against the bottom bracket, thereby causing an abrupt deceleration and downward-directed inertial force in the powder inside the metering device which propels the powder to move downward relative to the metering device and to pass through the discharge orifice, the lifting means arranged on the impact device.

12. The apparatus of claim 1, further comprising:
a spring element which pushes the metering device back to a rest position against the bottom bracket after the metering device is displaced by the impact device.

13. The apparatus of claim 1, further comprising:
an element for damping and/or absorbing vibration to prevent resonance vibrations and to slow down and stop a further movement of the metering device after an initial strike acceleration has subsided.

14. The apparatus of claim 1, further comprising:
a device for sensing a fill level of the powder in the receiving container; and
an electronic controller which receives continuous signals from the sensing device and regulates the frequency and intensity of the force pulses of the impact device, based on the signals from the sensing device, the flow properties of the powder and the desired quantity and accuracy of the powder delivery.

15. The apparatus of claim 14, wherein:
the sensing device is a weighing device that monitors the weight of the powder in the receiving container.

16. The apparatus of claim 14, wherein:
the sensing device is an optical sensor that monitors the fill level of powder in the receiving container.

17. The apparatus of claim 1, further comprising:
a vertical feed screw in the metering device; and
a stirrer device in the metering head, the stirrer device rotatable about a central longitudinal axis of the metering device to introduce a flow pattern in the powder in the metering head, such that powder which is not expelled through the discharge orifice by the vertical feed screw is directed radially outwardly and upwardly on a circulatory path that returns the same powder for a new approach to the vertical feed screw.

18. The apparatus of claim 17, wherein:
the stirrer device comprises:
a first stirrer element, configured as a thin rod which extends parallel to the central longitudinal axis at a narrow distance essentially along the entire length of the vertical feed screw, the first stirrer element being rotatable about the central longitudinal axis, so that the first stirrer element sweeps a cylindrical space surrounding the vertical feed screw in the rotation about the central longitudinal axis.

19. A method for dispensing measured doses of a powder into a receiving container from a metering device comprising a reservoir container with a metering head having a discharge orifice and a flow-control element to control the rate at which powder leaves the discharge orifice, the method comprising the steps of:
positioning the metering device above the receiving container; and
striking the metering device with an impact device that generates upwardly-directed force pulses of high intensity and short duration, such that a bottom bracket and a top bracket, each bracket located external to the metering device, co-act to constrain a range of vertical play of the metering device resulting from the impact device.

20. The method of claim 19, wherein the striking step comprises the substep of:
generating the upwardly-directed force pulse when the metering device is at rest, such that each force pulse creates an abrupt upward acceleration and upward movement of the metering device, resulting in a downward-directed inertial force in the powder inside the metering device, propelling the powder to move downwardly relative to the metering device and out of the metering device through the discharge orifice.

21. The method of claim 19, wherein the striking step comprises the substep of:
generating the upwardly-directed force pulse by abruptly stopping a downward movement of the metering device, resulting in an abrupt deceleration and downward-directed inertial force in the powder inside the metering device, propelling the powder to move downwardly relative to the metering device and out of the metering device through the discharge orifice.

22. The method of claim 20, wherein:
the upwardly-directed force-pulses are generated continuously at a rate ranging from about 1 to about 20 cycles per second with a controlled intensity of the impact and a movement amplitude of as much as 5 mm.

* * * * *

UNITED STATES PATENT AND TRADEMARK OFFICE
CERTIFICATE OF CORRECTION

PATENT NO. : 8,393,497 B2
APPLICATION NO. : 12/366407
DATED : March 12, 2013
INVENTOR(S) : Fontaine et al.

It is certified that error appears in the above-identified patent and that said Letters Patent is hereby corrected as shown below:

On the title page, Item (75) Inventors:, please delete "Ivan-William Fontaine, Neuilly-sur-Mame (FR)" and insert -- Ivan-William Fontaine, Neuilly-sur-Marne (FR) --.

Signed and Sealed this
Fourteenth Day of May, 2013

Teresa Stanek Rea
*Acting Director of the United States Patent and Trademark Office*